United States Patent
Medhi et al.

(10) Patent No.: US 12,430,847 B2
(45) Date of Patent: Sep. 30, 2025

(54) 3D IMAGING FOR ENGINE ASSEMBLY INSPECTION

(71) Applicants: General Electric Company, Schenectady, NY (US); OLIVER CRISPIN ROBOTICS LIMITED, Cheshire (GB)

(72) Inventors: Biswajit Medhi, Bangalore (IN); Vamshi Krishna Reddy Kommareddy, Bangalore (IN); Andrew Crispin Graham, Badminton (GB); Charles Burton Theurer, Alplaus, NY (US); James Vradenburg Miller, Clifton Park, NY (US); Walter V. Dixon, Delanson, NY (US); Prasad Thapa, Bangalore (IN)

(73) Assignees: General Electric Company, Evendale, OH (US); Oliver Crispin Robotics Limited, Altrincham (GB)

( * ) Notice: Subject to any disclaimer, the term of this patent is extended or adjusted under 35 U.S.C. 154(b) by 174 days.

(21) Appl. No.: 18/379,935

(22) Filed: Oct. 13, 2023

(65) Prior Publication Data

US 2025/0054229 A1 Feb. 13, 2025

(30) Foreign Application Priority Data

Aug. 10, 2023 (IN) .............................. 202311053680

(51) Int. Cl.
| | |
|---|---|
| G06T 17/00 | (2006.01) |
| G06T 5/20 | (2006.01) |
| G06T 7/20 | (2017.01) |
| G06T 7/70 | (2017.01) |
| G06V 10/143 | (2022.01) |
| G06V 10/74 | (2022.01) |

(52) U.S. Cl.
CPC ................ *G06T 17/00* (2013.01); *G06T 5/20* (2013.01); *G06T 7/20* (2013.01); *G06T 7/70* (2017.01); *G06V 10/143* (2022.01); *G06V 10/761* (2022.01)

(58) Field of Classification Search
None
See application file for complete search history.

(56) References Cited

U.S. PATENT DOCUMENTS

| | | |
|---|---|---|
| 5,278,642 A | 1/1994 | Danna |
| 7,257,248 B2 | 8/2007 | Kokku |

(Continued)

FOREIGN PATENT DOCUMENTS

| | | |
|---|---|---|
| CN | 207585438 U | 7/2018 |
| KR | 20230025796 | 2/2023 |

*Primary Examiner* — Nicholas R Wilson
(74) *Attorney, Agent, or Firm* — Fitch, Even, Tabin & Flannery LLP

(57) ABSTRACT

Systems and methods for engine imaging are provided. An imaging system includes an optical sensor coupled to an insertion tool and a light source configured to output alight projection onto a component of the engine assembly. The system includes a processor configured to: receive data comprising a plurality of frames from the optical sensor captured while the component of the engine assembly is rotating, determine an angular displacement of the component between frames, and form a 3D point cloud of the component based on combining the data in the frames based on the angular displacement of the component between the frames.

20 Claims, 8 Drawing Sheets

(56) References Cited

U.S. PATENT DOCUMENTS

| | | |
|---|---|---|
| 8,213,022 B1 | 7/2012 | Riza |
| 9,316,564 B2 | 4/2016 | Kobayashi |
| 9,482,585 B2 | 11/2016 | Singh |
| 2005/0199832 A1 | 9/2005 | Twerdochlib |
| 2006/0126902 A1 | 6/2006 | Matsuda |
| 2013/0335530 A1 | 12/2013 | Hatcher, Jr. |
| 2022/0082473 A1 | 3/2022 | Peters |
| 2022/0107174 A1 | 4/2022 | Wong |

Frame 1

Frame 2

Combined Point Cloud

3D IMAGING FOR ENGINE ASSEMBLY INSPECTION

FIELD OF THE DISCLOSURE

The present subject matter relates generally to an imaging tool, and specifically to a three-dimensional (3D) imaging tool for engine assembly inspection.

BACKGROUND

Complex devices such as jet engines can develop wear and tear from general use that can lead to performance degradation and failure. Wear and tear can occur at various locations of the devices including interior areas that are difficult to access without disassembling the device. Insertion imaging systems such as borescopes can be inserted through inspection ports to perform inspections of the interior of a jet engine. However, the form factor and the field of view of an insertion imaging system can both be limited due to the space constraints of the insertion pathway and the engine interior.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
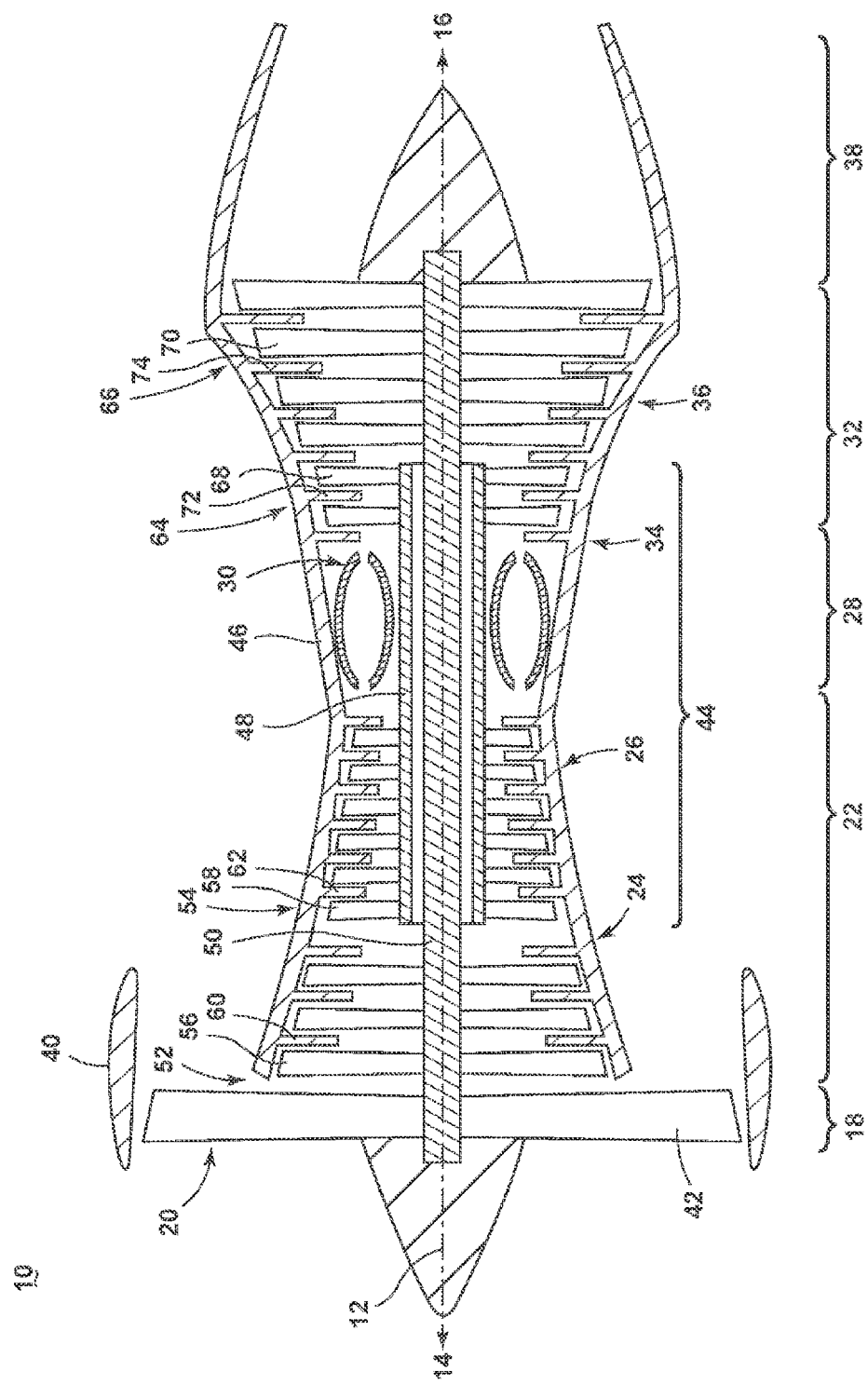
FIG. 1 is a cross-sectional schematic view of a high-bypass turbofan jet engine in accordance with some embodiments of the present disclosure.

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first," "second," "third," etc. may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "almost," and "substantially" are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, either or both endpoints defining numerical ranges, and/or the margin for ranges between endpoints. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Typically, borescope inspection (BSI) or, more generally, inspection using an insertion tool, is done periodically to assess the distress level of components inside a fully assembled aircraft engine. Such inspections may be done under continuous illumination when the component is in motion. Once an inspector identifies distress on the component, the inspector may stop the motion of the component and move the component and the BSI device or other insertion tool to obtain a desired view of the distress. At this point, the inspector may also change BSI from a 2D evaluation to a 3D Point cloud (PC) generation and perform 3D measurements around a point of interest. The 3D measurements allow for the comparison of the measured dimensions of the distress and the tolerance thresholds associated with the specific component. 3D measurements may be taken via 3D stereo (2-camera system or a single camera with split prism view) and/or structured light pattern projection in combination with a vision system to establish a 3D point cloud. Generally, however, conventional 3D scanning techniques require the inspected component to be static. As such, an inspector typically stops the component motion (e.g., rotation of a compressor section) during the 3D scan.

In some embodiments, the systems and methods described herein provide an imaging tool configured to provide consistent images without being affected by the subjectivity or skill level of the operators. In some embodiments, the systems and methods described herein provide a light projection in combination with the consistent imaging tool to generate a 3D point cloud when the component is in motion. The imaging device described herein can reduce the inspection time and increase the consistency of data capture performed by different operators and across inspection sites. In some embodiments, the system includes a multicolor (e.g., red, green, blue) light projector system (e.g., laser line, structured light) at an offset to the camera when the component is in the field of view of the camera. In some embodiments, RGB channels in each frame are processed to obtain laser projection patterns which are combined into a point cloud. In some embodiments, as the video of the moving component is captured along with the laser lines, points from each color line are converted to one or more 3D point clouds. In some embodiments, the 3D point clouds are formed based on the position of the imaging system with respect to the component from a computer-aided design (CAD) model. In some embodiments, the 3D point cloud of the component is reconstructed with appropriate corrections to the magnification. In some embodiments, the motion of the component may be estimated through video analysis or through an external sensor (optical, roller, ultrasound, infrared, etc.,) and used by the point cloud construction algorithm to combine captured data points.

Referring now to the drawings, wherein identical numerals indicate the same elements throughout the figures. FIG. 1 is a schematic cross-sectional diagram of a conventional gas turbine engine 10 for an aircraft in which an imaging and inspection system described herein can operate. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34 and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

It will be appreciated that the engine 10 may further define a plurality of openings allowing for inspection of various components within the engine 10. For example, the engine 10 may define a plurality of insertion tool openings at various axial positions within the compressor section, combustion section 28, and turbine section 32. Additionally, as will be discussed below, the engine 10 may include one or more igniter ports within, e.g., the combustion section 28 of the engine 10, that may allow for inspection of the combustion section 28.

It should further be appreciated that the exemplary engine 10 depicted in FIG. 1 is by way of example only, and that in other exemplary embodiments, the engine 10 may have any other suitable configuration, including, for example, any other suitable number of shafts or spools, turbines, compressors, etc. Additionally, or alternatively, in other exemplary embodiments, any other suitable turbine engine may be inspected with the systems and methods described herein. For example, in other exemplary embodiments, the turbine engine may not be a turbofan engine, and instead may be configured as a turboshaft engine, a turboprop engine, turbojet engine, etc., or may be an industrial gas turbine engine for electricity generation, fluid pumping, etc.

Figure 2:
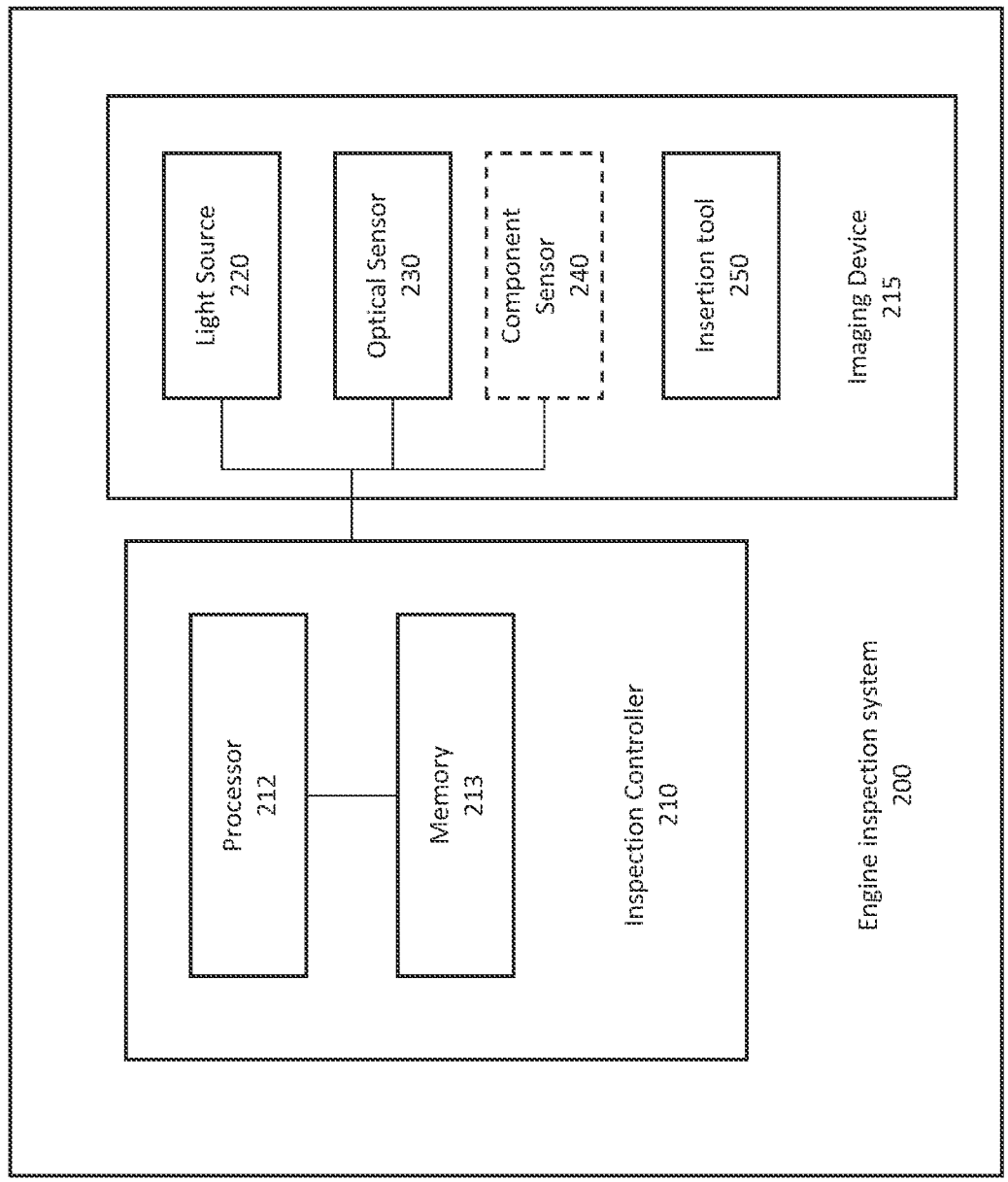
FIG. 2 is a block diagram of an inspection system in accordance with some embodiments of the present disclosure.

Referring now to FIG. 2, a engine inspection system 200 is shown. The system 200 includes an inspection controller 210 and an imaging device 215. The imaging device 215 includes a light source 220, an optical sensor 230, and in some embodiments, a component sensor 240 coupled to one or more insertion tools 250. The component sensor 240 may be a sensor that detects the position, motion flow, and/or speed of the rotating component being inspected. Generally, the component sensor 240 may output a signal that can be used by the processor 212 to determine/estimate the angular displacement of the rotating component. In some embodiments, the component sensor 240 may generate the signal based on the movement of the component, the movement of another component, and/or signals from another device such as a turning tool.

The inspection controller 210 includes a processor 212 coupled to a memory 213. In some embodiments, the inspection controller 210 may further include a data and/or network interface device for communicating with the light source 220, the optical sensor 230, the component sensor 240, and/or one or more databases for image processing and data storage as discussed herein. In some embodiments, the inspection controller 210 may include one or more of a control circuit, a microprocessor, a central processing unit (CPU), a graphics processing unit (GPU), an application-specific integrated circuit (ASIC), and the like and may be configured to execute computer-readable instructions stored on a computer-readable storage memory 213. The computer-readable storage memory 213 may include volatile and/or non-volatile memory and have stored upon it, computer-readable codes which, when executed by the processor, cause the inspection controller 210 to receive and process the data received from the optical sensor 230 and/or the component sensor 240. In some embodiments, the processor 212 may further be configured to control the operations of the light source 220, the optical sensor 230, and the component sensor 240. In some embodiments, the inspection controller 210 may further be configured to control the motion of one or more automated or semi-automated insertion tools 250 of the imaging device 215, such as a snake arm robot or robotic arm. In some embodiments, the inspection controller 210 may further be configured to control the actuation of one or more mechanical components of the imaging device 215 such as joints and tip extenders for spacing and/or angling the light source 220, the optical sensor 230, and/or the component sensor 240 relative to each other and/or the body of the insertion tool 250 within the engine interior. In some embodiments, the inspection controller 210 is configured to perform one or more steps described with reference to FIGS. 3 and 4 herein. The inspection controller 210 may be located locally or remotely from the engine being inspected and communicate with the light source 220, the optical sensor 230, and/or the component sensor 240 via a wired connection, a wireless local area network connection, and/or over a wide area network. In some embodiments, the inspection controller 210 may communicate with imaging devices 215 in one or more inspection spaces for the inspection of one or more aircraft components.

The insertion tool 250 generally refers to a tool configured to insert the light source 220 and/or the optical sensor 230 through a port on the casing of an engine to capture images of the interior of the engine. In some embodiments, insertion tool 250 may be an insertion tool and/or a borescope insertion tool. In some embodiments, the insertion tool 250 may include a flexible insertion tool, a rigidizable insertion tool, a robotic arm, or a snake arm robot. In some embodiments, the insertion tool 250 may be a manually operated tool, a semi-automated tool, or an automated tool. In some embodiments, the insertion tool 250 may be configured to position the optical sensor 230 and/or a light source 220 at a predefined location and orientation within the engine interior upon insertion. In some embodiments, the insertion tool 250 may include one or more channels for routing wires for transmitting signals between the inspection controller 210 and one or more of the light source 220, optical sensor 230, and/or component sensor 240. In some embodiments, the light source 220 is coupled to a second insertion tool separate from the optical sensor 230 which may be inserted through different ports of the engine assembly.

The light source 220 generally includes one or more light emitters for projecting one or more light patterns onto the component being inspected. In some embodiments, light source 220 may include one or more of a laser, a light-emitting diode (LED), and the like. In some embodiments, the light source 220 and the optical sensor 230 may be spaced apart and positioned along the length of the insertion tool 250. In some embodiments, the light source 220 is configured to project a line pattern onto the component. In some embodiments, the light source 220 is configured to project a structured-light pattern, a grid, horizontal bars, and/or vertical bars. In some embodiments, light source 220 may be configured to project a series of different patterns sequentially. For example, the light source 220 may project a first line at a first angle during a first rotation of the component and project a second line at a second angle during a second rotation of the component. In some embodiments, the insertion tool 250 may include two or more distal tips configured to extend apart upon insertion into the engine assembly, and the optical sensor 230 is positioned on a first distal tip and the light source 220 is positioned on a second distal tip.

In some embodiments, the light source 220 includes a plurality of light emitters configured to project light at different wavelengths. In some embodiments, the light emitters are configured to project different patterns at different wavelengths concurrently onto the component. For example, the light source 220 may include a blue laser, a green laser, and a red laser simultaneously projecting a pattern on the component. In some embodiments, the light emitters project lines that are angled relative to each other. In some embodiments, the emitters of the light source 220 may be configured to project patterns that at least partially overlap with each other and within the field of view of the optical sensor 230. In some embodiments, the light source 220 includes a plurality of light emitters positioned around the optical sensor 230 and coupled to the insertion tool 250. In some embodiments, the light source 220 includes a plurality of light emitters positioned along the length of the insertion tool 250. In some embodiments, the light source 220 includes a blue laser, a red laser, and a green laser. In some embodiments, the light source 220 may include emitters emitting at a wavelength inside or outside of the visible spectrum, such as infrared or ultraviolet.

The optical sensor 230 generally includes one or more light sensors configured to capture images of the light projection on the component. In some embodiments, the optical sensor 230 may include one or more sensor elements for detecting light inside or outside of the visible spectrum. In some embodiments, the optical sensor 230 may include sensor devices such as MOS, CCD, CMOS sensors, and the like. In some embodiments, the optical sensor 230 is configured to capture images in a plurality of color channels. In some embodiments, the optical sensor 230 includes a single sensor with optical filters (e.g., linear or Bayer filter, or any other color filter array) that separates incoming light into a series of colors. In some embodiments, the optical sensor 230 includes separate sensors for each color/wavelength channel, such as a three-chip color CCD camera. For example, the optical sensor 230 may include a monochrome sensor for the first wavelength and a second monochrome sensor for the second wavelength that differ by 50, 80, or 100 nm. In some embodiments, the color channels of the optical sensor 230 correspond to the wavelengths of the light emitters of the light source 220 (e.g., red, green, blue).

In some embodiments, the imaging device 215 further includes a component sensor 240 configured to detect the rotational speed of the component being inspected. In some embodiments, the component sensor 240 is spaced apart from the optical sensor 230 and/or the light source 220. In some embodiments, the component sensor 240 is coupled to the same or a different insertion tool 250 as the light source 220 and/or the optical sensor 230. In some embodiments, the component sensor 240 may be positioned outside of the enclosure of the engine assembly being inspected. For example, the component sensor 240 may monitor the rotation of fan blades 42, turbine blades 70, or the spinner of the engine from the exterior of the engine assembly. In some embodiments, the monitoring may be based on detecting for optical markers on these components. In some embodiments, the component sensor 240 may be coupled to a turning device that rotates the component of the engine assembly being inspected and use the output of the turning device to estimate the speed of the component rotation. In some embodiments, the component sensor 240 measures the rotational speed of the component based on capturing images of the components and/or detecting for visual encoding on the component or a shaft of the engine assembly. In some embodiments, the component sensor 240 may include a range finder configured to determine the rotational speed based on oscillations in the distance measurement corresponding to airfoils moving past the measurement point of the range finder. In some embodiments, the speed may be measured based on detecting nadirs in the distance measurement, corresponding to tips of airfoils passing in front of the component sensor 240. The component rotation speed measured by the component sensor 240 may be used to determine angular displacements between frames of images captured by the optical sensor 230 for combining the frames in a 3D point cloud. In some embodiments, the component sensor 240 may be omitted, and the angular displacements may be determined by other means, such as based on images captured by the optical sensor 230.

Figure 3:
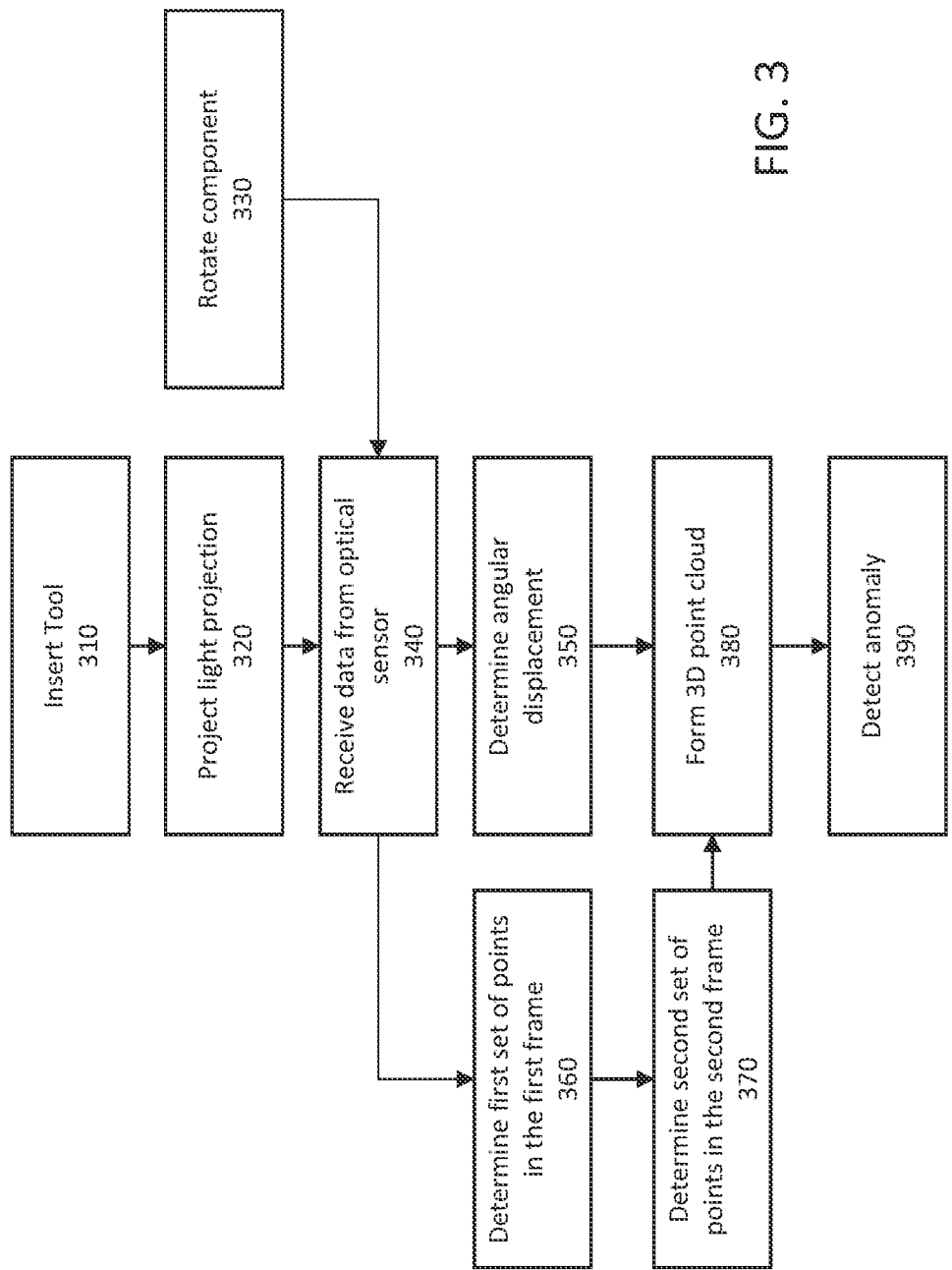
FIG. 3 is a flow diagram of a method in accordance with some embodiments of the present disclosure.

Next referring to FIG. 3, a method for performing engine inspection is shown. In some embodiments, one or more steps of FIG. 3 may be performed with the engine inspection system 200 described with reference to FIG. 2.

In step 310, an insertion tool, such as the insertion tool 250, is inserted into an engine assembly. In some embodiments, the insertion tool may be manually operated, semi-automated, or automated. In some embodiments, the insertion tool may include a rigidizable tool that is inserted and rigidized to position the optical sensor 230 and/or light source 220 of the inspection tool at a predefined location and/or orientation. In some embodiments, the insertion tool may be mechanically driven by signals from a controller into position.

In step 330, the component, such as the component 550, is rotated. In some embodiments, the component may include compressor airfoils, turbine airfoils, or shaft of an engine assembly. In some embodiments, the component may include airfoils and other structures of LP compressor 24, HP compressor 26, HP turbine 34, LP turbine 36, and/or fan blades 42 described with reference to FIG. 1. In some embodiments, the component may be a cylindrical section of the engine that is configured to rotate about a centerline 12 of the engine assembly on its axis. In some embodiments, the component may be rotated by a turning device configured to drive the rotation, such as an auxiliary power unit, an external power source, a device configured to apply mechanical torque to the fan blades 42 or the spinner of the engine assembly, or a device configured to turn the HP shaft or spool 48 via a gearbox, e.g., an accessory gearbox. In some embodiments, the inspection may be performed while the engine assembly is installed on an aircraft. In some embodiments, the component may be rotated manually, such as by hand or via a crank. In some embodiments, due to physical limitations of the turning device and the engine assembly, the rotational speed of the component may vary while images are captured. For example, the rotational speed of the component may increase and decrease within a single rotation.

In step 320, the light source 220 outputs a light projection onto a component of the engine assembly within the field of view of the optical sensor, such as the optical sensor 230. In some embodiments, the light projection is a laser projection. In some embodiments, the light projection is a line. In some embodiments, the light projection is a structured-light pattern, a grid, horizontal bars, and/or vertical bars. In some embodiments, the light source 220 includes a plurality of emitters outputting a plurality of projections each at a different peak wavelength. Details of embodiments with projections at multiple wavelengths are described in more detail with reference to FIG. 4.

In step 340, the inspection controller, such as the inspection controller 210, receives data from the optical sensor. In some embodiments, data from the optical sensor includes a plurality of image frames that are captured while the component of the engine assembly is rotating and the light projection is projected onto the engine assembly. In some embodiments, data received in step 340 may be processed to form a 3D point cloud per steps 350, 360, 370, and 380 in real-time or near real-time while the insertion tool is still inserted in the engine and the optical sensor is still capturing data. In some embodiments, data received in step 340 may be stored for later processing.

In step 350, the inspection controller determines an angular displacement of the component between a first frame and a second frame of the plurality of frames received in step 340. In some embodiments, angular displacement may be measured based on signals from the component sensor 240 described herein. For example, a range finder may be used to measure the rotation speed of the component. In some embodiments, the angular displacement of the component is determined based on detecting for visual encoding on the component or a shaft of the engine assembly in images captured by the optical sensor 230 and/or the component sensor 240. For example, the angular displacement may be measured based on pixel displacements of the visual encoding between frames. In some embodiments, the angular displacement of the component is determined based on illuminating the component with a broadband light (e.g., white light) and registering a distance and/or an orientation of the component in the frames. In some embodiments, the angular displacement of the component is determined by estimating the rotation speed of the component based on the plurality of frames captured by the optical sensor. In some embodiments, the light projection includes a line positioned to be tangential to a point on a leading edge of a compressor airfoil closest to the optical sensor or the light source 220 when the compressor airfoil is at a rotational position closest to the optical sensor or the light source 220, and the angular displacement of the component is determined based on detecting the point on the compressor airfoil via the light projection. In some embodiments, the angular displacement of the component between the first frame and the second frame is determined based on comparing the first frame and the second frame with a stored 3D model of the component. In some embodiments, the angular displacement between two frames may be estimated based on determining the rotation of the component over a time period (e.g., 2 rpm, 10 rpm, etc.), and dividing the measured total angular displacement by the number of frames taken during that time period (e.g., 60 fps, 120 fps, etc.).

In step 360, the inspection controller determines a set of points based on the first frame of the image captured by the optical sensor 230. In some embodiments, the first set of points includes 3D coordinates determined based on triangulating for the distance between the optical sensor 230 and a point on the component based on (1) the known distance and angle between the light source 220 and the optical sensor 230, and (2) displacements of the projected pixel associated with the point in the first image of the light projection. In some embodiments, the first set of points may include points on a local coordinate system relative to a reference point or plane of the imaging tool. In some embodiments, the first set of points is determined based on performing magnification correction on the first image of the light projection. In some embodiments, a distance (H)

between a point captured by the optical sensor 230 and a reference plane is determined based on a displacement in (vH) of a pixel in the first image of the light projection in the first frame, wherein H=vH/(m*tan(ø)); wherein ø is an angular offset between the optical sensor 230 and the light source 220, m is a magnification factor, and tan(ø)=d/u; and wherein d is the distance between the optical sensor 230 and the light source 220 and u is the distance between the optical sensor 230 and the reference plane.

In step 370, the inspection controller determines a second set of points based on a second frame of the image captured by the optical sensor 230. Generally, the second set of points is determined based on the same or similar process as described in step 360.

Figure 6:
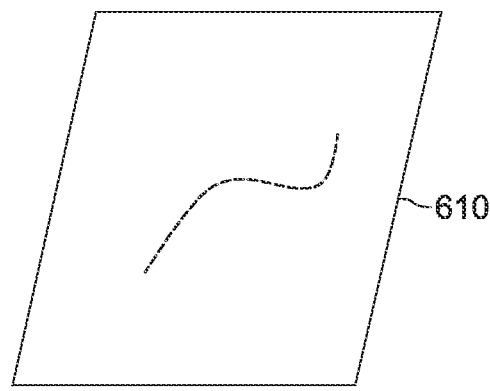
FIG. 6 is an illustration of a process for combining points in a point cloud in accordance with some embodiments of the present disclosure.
Figure 6:
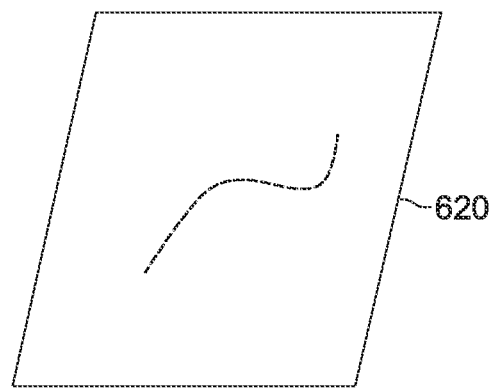
Figure 6:
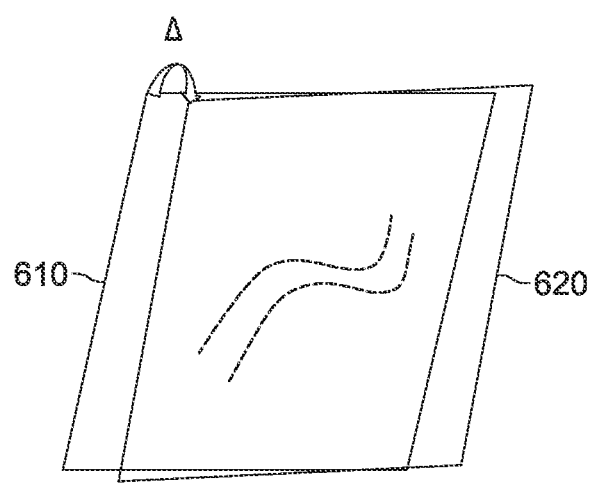

In step 380, the inspection controller forms a 3D point cloud based on combining at least the sets of points determined in steps 360 and 370. In some embodiments, the 3D point cloud may be based on any number of frames. The 3D point cloud of the component may be formed based on combining the first set of points and the second set of points based on the angular displacement of the component between the first frame and the second frame determined in step 350. In some embodiments, forming the 3D point cloud of the component includes translating local coordinates of the first set of points and the second set of points to a global coordinate of the 3D point cloud based on the angular displacement. An example of such translation is shown in FIG. 6. In FIG. 6, points from a first frame 610 and a second frame 620 are positioned relative to each other based on the angular displacement (Δ) between the two frames. In some embodiments, the displacement between the two frames may include both y-axis (tangential to the direction of component rotation) and z-axis (perpendicular to the planes of the frame) shifts. In some embodiments, the displacements between the set of points may be determined based on the measured angular displacement and a distance between the reference plane or point and the optical sensor 230 and/or a known distance between the optical sensor 230 and the component's axis of rotation. The system can combine any number of frames based on the same or similar process to form a 3D model of the component being inspected. For example, with a full rotation of a compressor section, the system can form a 360-degree 3D model of the compressor section around the axis of rotation.

In some embodiments, the 3D point cloud is generated based on taking means between adjacent points on the first set of points and the second set of points and/or applying a smoothing function. In some embodiments, the 3D point cloud of the component may further be determined based on performing outlier removal on the first or second sets of points or on the formed 3D point cloud. In some embodiments, the system is configured to determine points in the first set of points and the second set of points associated with a stationary component (e.g. casing wall, vanes) of the engine. In some embodiments, the system may remove the points associated with the stationary component in the 3D point cloud of the component. In some embodiments, the system may separately process the points associated with the stationary components and combine the moving and stationary components in the 3D point cloud model. For example, points associated with stationary components may be combined without performing frame shifts based on angular displacement. In some embodiments, the points associated with the stationary component of the engine are determined based on comparing images of the light projection in the plurality of frames to identify static/unchanging points. In some embodiments, the points associated with the stationary component of the engine are determined based on comparing the 3D model with a stored computer model of the rotating component.

In some embodiments, the system may be configured to determine that sufficient data has been captured to form a 3D point cloud. For example, the system may detect that the component has made a full rotation and/or data has been captured around the full circumference of the component. The system may then signal the inspection tool and/or a user interface to terminate the inspection.

In some embodiments, after step 380, the system may further be configured to detect anomalies on the component based on the 3D point cloud in step 390. In some embodiments, anomalies may be detected based on comparing the 3D point cloud and a stored 3D model of the component of the engine assembly. In some embodiments, anomalies may be detected based on a local surface outlier detection.

Figure 4:
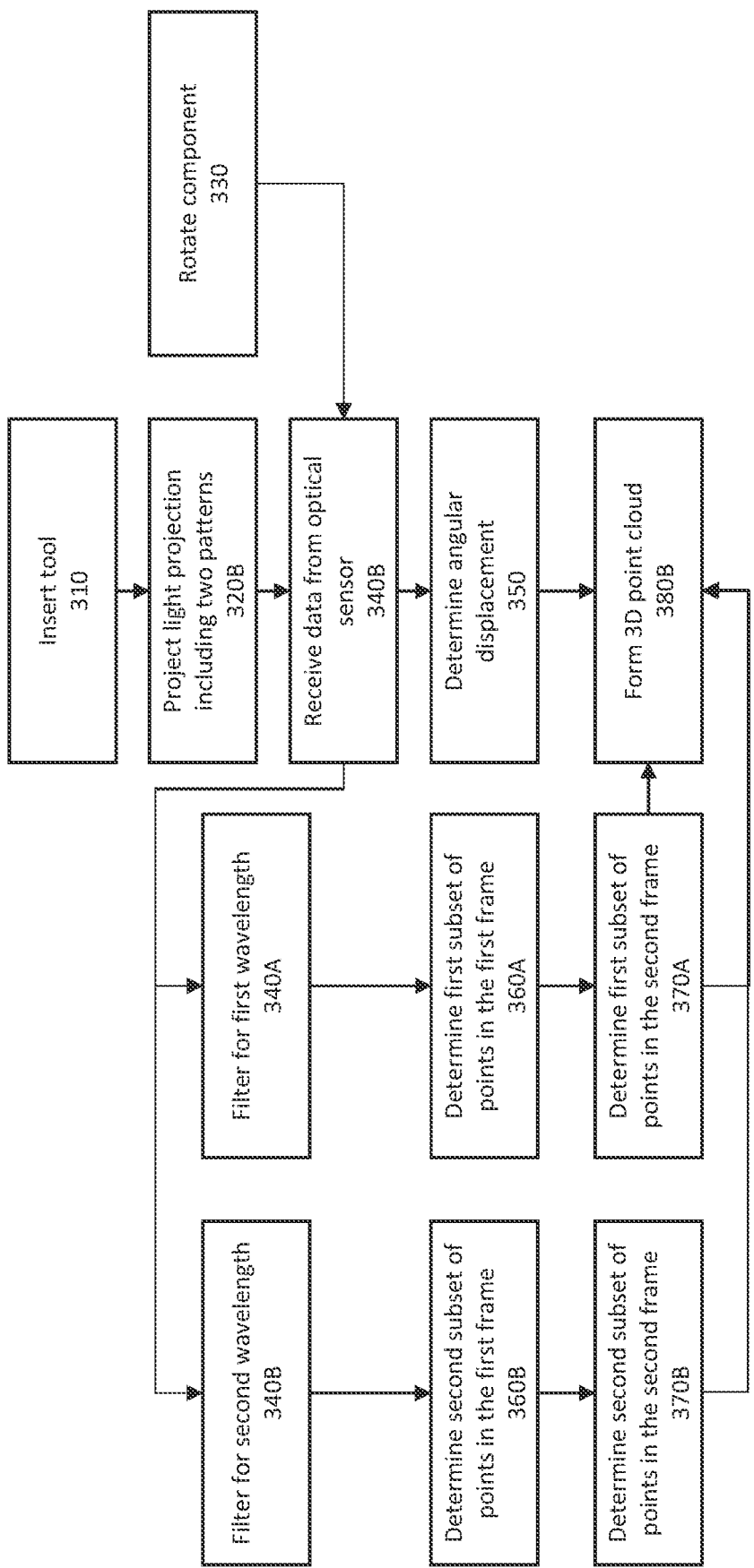
FIG. 4 is a flow diagram of another method in accordance with some embodiments of the present disclosure.

Next referring to FIG. 4, a method for performing engine inspection with multiple color channels is shown. In some embodiments, one or more steps of FIG. 4 may be performed with the inspection system described with reference to FIG. 2. In some embodiments, steps in FIG. 4 may be the same as or similar to steps sharing the same reference number in FIG. 3.

In the embodiment shown in FIG. 4, in step 320B, the light source 220 projects two or more patterns each having a different peak wavelength/color onto the component. In some embodiments, the peak wavelengths of the first wavelength and the second wavelength differ by at least 50 nanometers. In some embodiments, the wavelength differs by 80 nanometers, 100 nanometers, or more. In some embodiments, the light projection includes a first line at a first wavelength and a second line at a second wavelength, the second line being angled relative to the first line. In some embodiments, each of the patterns may include a line, a structured-light pattern, a grid, horizontal bars, and/or vertical bars. In some embodiments, the patterns at least partially overlap in the field of view of the optical sensor 230. In some embodiments, the first pattern and the second pattern are projected concurrently or sequentially. In some embodiments, the light source 220 projects three patterns at three wavelengths (e.g. red, green, blue). In some embodiments, the patterns may be a line, a structured light pattern, etc.

In step 340B, the inspection controller, such as the inspection controller 210, receives data from the optical sensor 230. In some embodiments, data from the optical sensor 230 includes multiple color channels. In some embodiments, the optical sensor 230 includes multiple monochrome sensors, such as a monochrome sensor for the first wavelength and a second monochrome sensor for the second wavelength. In some embodiments, the optical includes linear or Bayer filters or some other color filter array for separating the color channels.

In step 340A, the system filters the frame for the first wavelength. In some embodiments, step 340A may be based on isolating the color channel associated with the first wavelength from the data received from the optical sensor 230. In some embodiments, step 340A may include applying a software color filter on the captured color image. In step 360A, the system determines a first subset of points in the first frame associated with the first pattern having the first wavelength. The determination of the first subset of the points may be the same or similar to the process described with reference to 360. In step 370A, the system determines a first subset of points in the second frame associated with the first pattern having the first wavelength. The determination of the second subset of points may be the same or similar to the process described with reference to step 370.

In step 340B, the inspection controller filters the frames for the second wavelength. In some embodiments, step 340B may be based on isolating the color channel associated with the second wavelength from the data received from the optical sensor 230. In some embodiments, step 340B may include applying a software color filter on the captured color image. In step 360B, the system determines a first subset of points in the first frame associated with the second pattern having the second wavelength. The determination of the second subset of the points of the first frame may be the same or similar to the process described with reference to 360. In step 370B, the system determines a second subset of points in the second frame associated with the second pattern having the second wavelength. The determination of the second subset of points of the second frame may be the same or similar to the process described with reference to 370. Generally, steps 360A, 370A, 360B, and 370B and be performed in any order and/or concurrently.

In step 380B, a 3D point cloud is formed by the inspection controller based at least on the subset of points determined in steps 360A, 370A, 360B, and 370B. The subset of points may be combined based on the angular displacement between the frame as discussed with reference to FIG. 3. In some embodiments, points from different color channels may be combined or stitched by taking a mean or weighted mean of adjacent points. In some embodiments, the overall resolution of the 3D point cloud may increase based on combining data from the different color channels of the optical sensor as compared to triangulating based on a monochrome image. In some embodiments, the projections may have different incident angles relative to the surface of the component and/or to each other in the plane of the frame to enhance the detection of different surface feature/anomaly geometries. For example, a linear distress may be better detected by a line projection that is at an angle to it as compared to a line projection parallel to the line of the distress.

While filtering for two wavelengths is shown and described with reference to FIG. 4, systems and methods described herein may utilize any number of color channels of projections such as three (e.g. red, green, blue), four, five, or six discrete color channels. The channels may be filtered, processed, and combined according to the processes described in FIGS. 3 and 4.

Figure 5A:
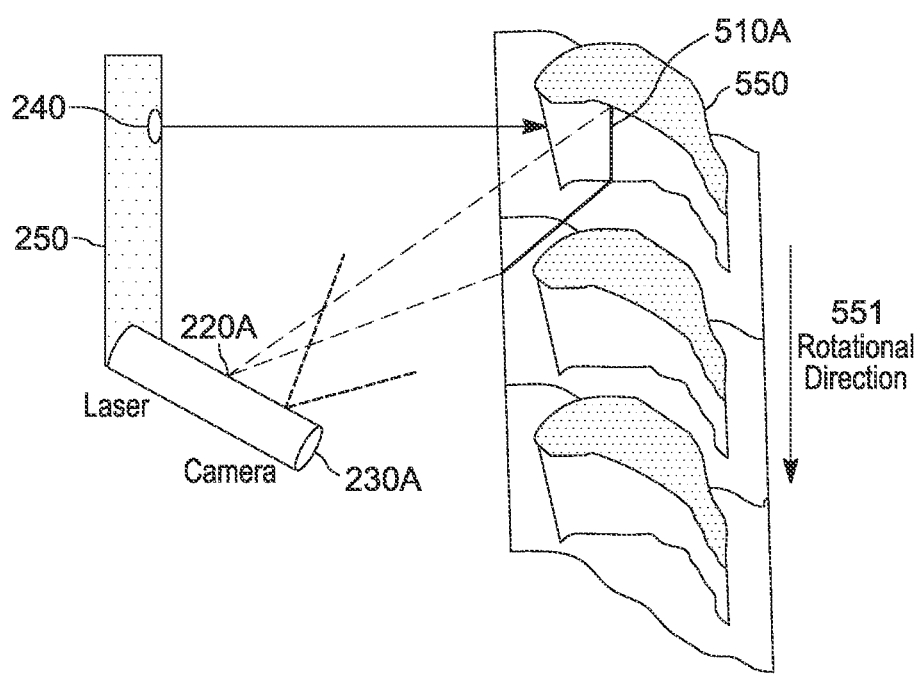
FIGS. 5A, 5B, and 5C are illustrations of inspection devices in accordance with some embodiments of the present disclosure.
Figure 5B:
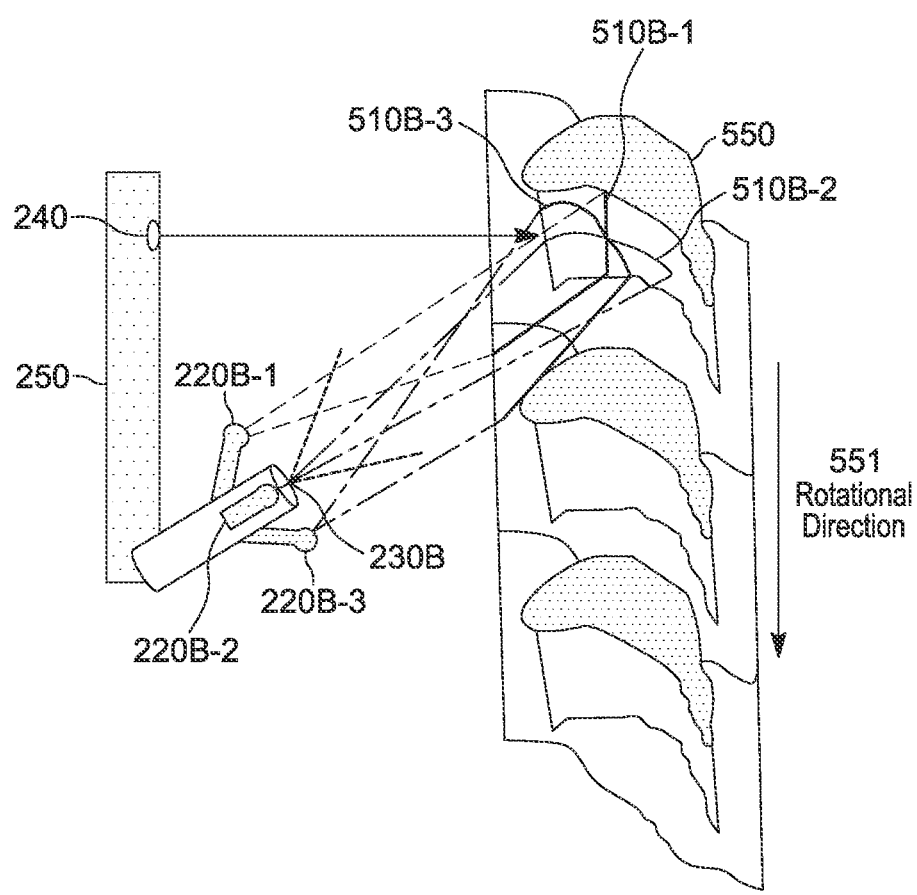
Figure 5C:
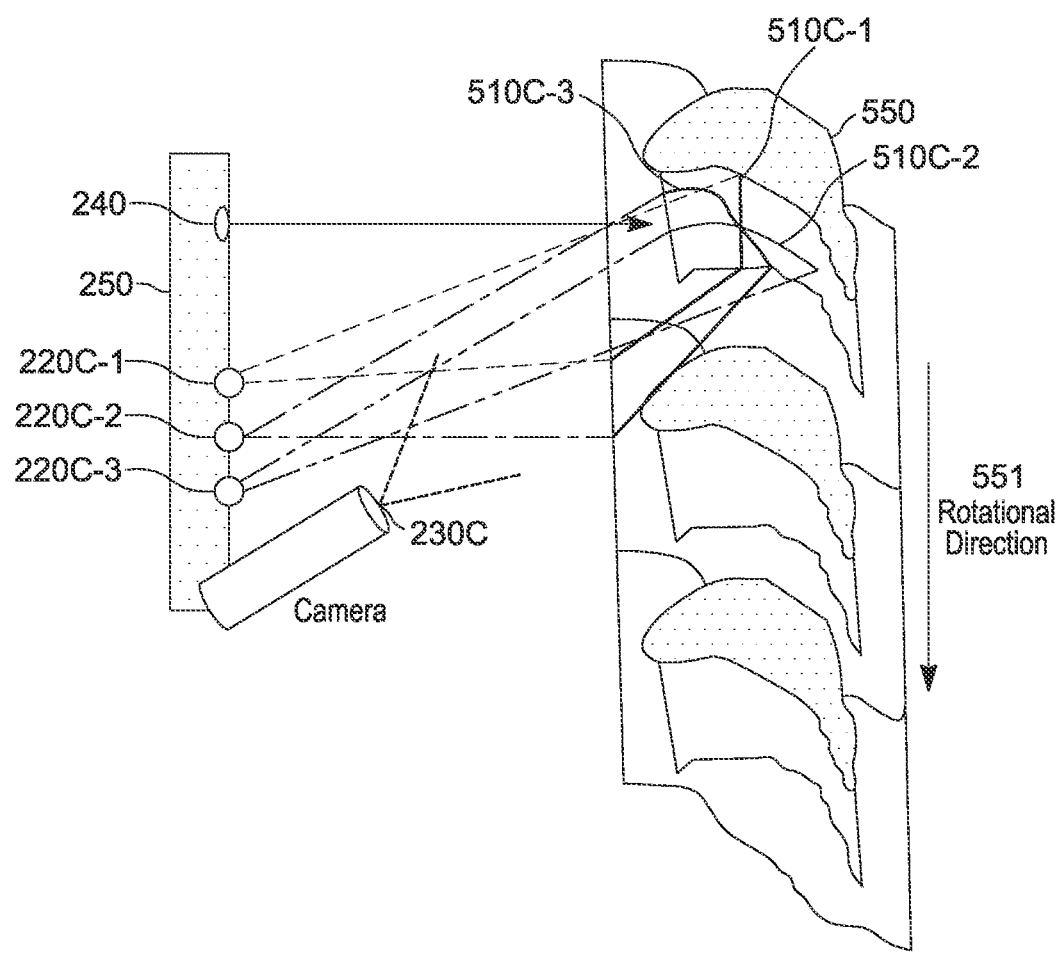

Next referring to FIGS. 5A-C, examples of imaging device configurations according to some embodiments are shown. In FIG. 5A, a light source 220A, an optical sensor 230A, and a component sensor 240 are coupled to the distal tip of an insertion tool 250. The insertion tool 250 is inserted through a port of an engine assembly to provide a line of sight to the inspected component 550. In some embodiments, the component 550 may be airfoils of a fan or a compressor of a turbo engine 10. The light source 220A is positioned to project a light pattern 510A onto the surface of the component 550 and the optical sensor 230A is positioned to capture images of the projection while the component 550 rotates around an axis of the engine assembly section. The air foils es of the component 550 are shown as moving downwards as indicated by the arrow 551. However, it will be appreciated that this image shows a flat representation of a set of objects (e.g., blades) mounted on a cylindrical support (e.g., shaft or disc) that rotates about the engine centerline.

In the embodiment shown in FIG. 5A, the component sensor 240, the light source 220A, and the optical sensor 230A are positioned along the length of the insertion tool 250. In some embodiments, one or more of the component sensor 240, insertion tool 250, and the optical sensor 230A may be coupled to segments of the insertion tool 250 that are pivotable and/or rigidizable relative to each other. In some embodiments, the insertion tool 250 may comprise distal tips with the light source 220A and the optical sensor 230A mounted on different tips that are configured to independently pivot relative to the prior segment. An actuator may actuate the two distal tips apart upon insertion of the insertion tool 250.

In FIG. 5B, the light source 220 includes three emitters—red emitter 220B-1, blue emitter 220B-2, and green emitter 220B-3 that are positioned around an optical sensor 230B at the tip of the insertion tool 250. In some embodiments, the emitters may include actuators that are configured to retract the emitters when the insertion tool 250 is being inserted into the engine assembly and extend the emitters to the position shown in FIG. 5B when the tool is in position to perform data capture. In some embodiments, the emitters may retract again to withdraw the insertion tool 250 from the engine interior. In some embodiments, the emitter actuators may be powered, line controlled, and/or spring-loaded. The red emitter 220B-1, blue emitter 220B-2, and green emitter 220B-3 each project a pattern at a discrete wavelength, including a red line projection 510B-1, a blue line projection 510B-2, and a green line projection 510B-3. The optical sensor 230B may include filters for separating out the three color channels and/or may include multiple monochrome sensors.

In FIG. 5C, the light source 220 includes three emitters—red emitter 220C-1, blue emitter 220C-2, and green emitter 220C-3 that are positioned along the length of the insertion tool 250. The optical sensor 230C is positioned at the tip of the component sensor 240. The emitters 220C-1, 220C-2, 220C-3 are coupled to a first segment of the component sensor 240 and the optical sensor 230C is coupled to a second segment that is angled relative to first segment. In some embodiments, the two segments are configured to pivot relative to each other. In some embodiments, each of the emitters 220C-1, 220C-2, 220C-3 may be on different segments of the insertion tool 250 that are pivotable and/or angled relative to each other. The red emitter 220C-1, blue emitter 220C-2, and green emitter 220C-3 each project a pattern at a discrete wavelength, including a red line projection 510C-1, a blue line projection 510C-2, and a green line projection 510C-3. The optical sensor 230C may include filters for separating out the three color channels and/or may include multiple monochrome sensors.

The imaging tool configurations shown in FIGS. 5A-C are provided as an example only, and it will be understood that the systems and methods described herein utilized a number of differently configured imaging tools having at least an optical sensor 230 and a light source 220 as variously described herein.

Further aspects of the disclosure are provided by the subject matter of the following clauses:

An engine inspection system, including: an optical sensor coupled to an insertion tool configured to be inserted into an engine assembly to perform inspection; a light source configured to output a light projection onto a component of the engine assembly within a field of view of the optical sensor; and a processor configured to: receive data including a plurality of frames from the optical sensor captured while the component of the engine assembly is rotating and the light projection is projected onto the engine assembly; determine an angular displacement of the component between a first frame and a second frame of the plurality of frames; determine a first set of points based on a first image of the light projection in the first frame; determine a second set of points based on a second image of the light projection in the second frame; and form a 3D point cloud of the component based on combining the first set of points and the second set of points based on the angular displacement of the component between the first frame and the second frame.

The system of any preceding clause, wherein the light projection is a line.

The system of any preceding clause, wherein the light projection includes a structured-light pattern, a grid, horizontal bars, and/or vertical bars.

The system of any preceding clause, wherein the angular displacement of the component is determined based on detecting for visual encoding on the component or a shaft of the engine assembly.

The system of any preceding clause, wherein the angular displacement of the component is determined based on illuminating the component and the light source with a broadband light and registering a distance and/or an orientation of the component.

The system of any preceding clause, further including a component sensor spaced apart from the optical sensor, wherein the angular displacement of the component is determined based on signals from the component sensor.

The system of any preceding clause, wherein the component sensor is coupled to the insertion tool or a separate insertion tool.

The system of any preceding clause, wherein the component sensor is positioned outside of an enclosure of the engine assembly.

The system of any preceding clause, wherein the angular displacement of the component is determined by estimating a rotation speed of the component based on the plurality of frames captured by the optical sensor.

The system of any preceding clause, wherein the light projection includes a line positioned to be tangential to a point on a leading edge of a compressor airfoil closest to the optical sensor or the light source when the compressor airfoil is at a rotational position closest to the optical sensor or the light source, and wherein the processor is configured to determine the angular displacement of the component based on detecting the point on the compressor airfoil via the light projection.

The system of any preceding clause, wherein the angular displacement of the component between the first frame and the second frame is determined based on comparing the first frame and the second frame with a stored 3D model of the component.

The system of any preceding clause, wherein the first set of points includes 3D coordinates determined based on triangulating based on a known distance between the light source and the optical sensor and displacements of pixels in the first image of the light projection.

The system of any preceding clause, wherein the first set of points is determined based on performing magnification correction on the first image of the light projection.

The system of any preceding clause, wherein a distance (H) between a point captured by the optical sensor and a reference plane is determined based on a displacement in (vH) of a pixel in the first image of the light projection in the first frame, wherein $H = vH/(m*\tan(\varnothing))$; wherein $\varnothing$ is an angular offset between the optical sensor and the light source, m is a magnification factor, and $\tan(\varnothing) = d/u$; and wherein d is the distance between the optical sensor and the light source and u is the distance between the optical sensor and the reference plane.

The system of any preceding clause, wherein the 3D point cloud of the component is further determined based on performing outlier removal.

The system of any preceding clause, wherein the processor is further configured to determine points in the first set of points and the second set of points associated with a stationary component of the engine and remove the points in the 3D point cloud of the component.

The system of any preceding clause, wherein the points associated with the stationary component of the engine are determined based on comparing images of the light projection in the plurality of frames to identify static points.

The system of any preceding clause, wherein forming the 3D point cloud of the component includes translating local coordinates of the first set of points and the second set of points to a global coordinate of the 3D point cloud based on the angular displacement.

The system of any preceding clause, wherein the light projection includes a plurality of patterns projected sequentially.

The system of any preceding clause, wherein the insertion tool includes a flexible insertion tool, a rigidizable insertion tool, a robotic arm, or a snake arm robot.

The system of any preceding clause, wherein the insertion tool includes two distal tips configured to extend apart upon insertion into the engine assembly, and the optical sensor is positioned on a first distal tip and the light source is positioned on a second distal tip.

The system of any preceding clause, wherein the light source is coupled to an insertion tool separate from the insertion tool, and wherein the insertion tool and the insertion tool are inserted through different ports of the engine assembly.

The system of any preceding clause, wherein the light source includes one or more laser light emitters.

The system of any preceding clause, wherein the light source includes a plurality of light emitters positioned around the optical sensor and coupled to the insertion tool.

The system of any preceding clause, wherein the light source includes a plurality of light emitters positioned along a length of the insertion tool.

The system of any preceding clause, wherein the light source is coupled to a first segment of the insertion tool and the optical sensor is coupled to a second segment of the insertion tool, the second segment being angled relative to the first segment during the capturing of the plurality of frames.

The system of any preceding clause, wherein the light source includes two or more of a blue light, a red light, and a green light.

The system of any preceding clause, wherein the light source includes a first light emitter outputting a first pattern of the light projection at a first wavelength and a second light emitter outputting a second pattern of the light projection at a second wavelength; and wherein the first set of points is determined based on: filtering the first frame for the first wavelength to determine a first subset of points associated with the first pattern, and filtering the first frame for the second wavelength to determine a second subset of points associated with the second pattern.

The system of any preceding clause, wherein the optical sensor includes a monochrome sensor for the first wavelength and a second monochrome sensor for the second wavelength.

The system of any preceding clause, wherein the filtering of the first frame is based on a linear filter or a Bayer filter.

The system of any preceding clause, wherein peak wavelengths of the first wavelength and the second wavelength differ by at least 50 nanometers.

The system of any preceding clause, wherein the first pattern includes a first line and the second pattern includes a second line angled relative to the first line.

The system of any preceding clause, wherein the first pattern or the second pattern includes a structured-light pattern, a grid, horizontal bars, and/or vertical bars.

The system of any preceding clause, wherein the first pattern and the second pattern at least partially overlap in the field of view of the optical sensor.

The system of any preceding clause, wherein the first pattern and the second pattern are projected concurrently.

The system of any preceding clause, wherein the first pattern and the second pattern are projected sequentially.

The system of any preceding clause, wherein the light source further includes a third light emitter that outputs a third pattern at a third wavelength, and wherein determining the first set of points further includes: determining a third subset of points based on filtering the first frame for the third wavelength.

The system of any preceding clause, wherein the component of the engine assembly includes compressor or turbine airfoils.

The system of any preceding clause, wherein the 3D point cloud is generated based on taking means between adjacent points on the first set of points and the second set of points.

The system of any preceding clause, wherein the processor is further configured to detect anomalies on the component based on the 3D point cloud.

The system of any preceding clause, wherein the anomalies are detected based on comparing the 3D point cloud and a stored 3D model of the component of the engine assembly.

The system of any preceding clause, wherein the anomalies are detected based on identifying outliers in a first set of points compared to a second set of points, and by aligning two or more sets of points for combination into a point cloud.

An engine inspection method, including: rotating a component of an engine assembly; projecting, from a light source, a light projection onto the component of the engine assembly within a field of view of an optical sensor inserted into the engine assembly via an insertion tool; receiving, at a processor, data including a plurality of frames from the optical sensor, the data being captured while the component of the engine assembly is rotating and the light projection is projected onto the component; determining, with the processor, an angular displacement of the component between a first frame and a second frame of the plurality of frames; determining, with the processor, a first set of points based on a first image of the light projection in the first frame; determining, with the processor, a second set of points based on a second image of the light projection in the second frame; and forming, with the processor, a 3D point cloud of the component based on combining the first set of points and the second set of points based on the angular displacement of the component between the first frame and the second frame.

The method of any preceding clause, wherein the light projection is a line.

The method of any preceding clause, wherein the light projection includes a structured-light pattern, a grid, horizontal bars, and/or vertical bars.

The method of any preceding clause, wherein the angular displacement of the component is determined based on detecting for visual encoding on the component or a shaft of the engine assembly.

The method of any preceding clause, wherein the angular displacement of the component is determined based on illuminating the component and the light source with a broadband light source and registering a distance and/or orientation of the component relative to the optical sensor in multiple frames. The method of any preceding clause, wherein the angular displacement of the component is determined based on signals from a component sensor spaced apart from the optical sensor The method of any preceding clause, wherein the component sensor is coupled to the insertion tool or a separate insertion tool.

The method of any preceding clause, wherein the component sensor is positioned outside of an enclosure of the engine assembly.

The method of any preceding clause, wherein the angular displacement of the component is determined by estimating a rotation speed of the component based on the plurality of frames captured by the optical sensor.

The method of any preceding clause, wherein the light projection includes a line positioned to be tangential to a point on a leading edge of a compressor airfoil closest to the optical sensor or the light source when the compressor airfoil is at a rotational position closest to the optical sensor or the light source, and the angular displacement of the component is determined based on detecting the point on the compressor airfoil via the light projection.

The method of any preceding clause, wherein the angular displacement of the component between the first frame and the second frame is determined based on comparing the first frame and the second frame with a stored 3D model of the component.

The method of any preceding clause, wherein the first set of points includes 3D coordinates determined based on triangulating based on a known distance between the light source and the optical sensor and displacement of a point of light in the first image of the light projection.

The method of any preceding clause, wherein the first set of points is determined based on performing magnification correction on the first image of the light projection.

The method of any preceding clause, wherein a distance (H) between a point captured by the optical sensor and a reference plane is determined based on a displacement in (vH) of a pixel in the first image of the light projection in the first frame, wherein $H=vH/(m*\tan(ø))$; wherein ø is an angular offset between the optical sensor and the light source, m is a magnification factor, and $\tan(ø)=d/u$; and wherein d is the distance between the optical sensor and the light source and u is the distance between the optical sensor and the reference plane.

The method of any preceding clause, wherein the 3D point cloud of the component is further determined based on performing outlier removal.

The method of any preceding clause, further including: determining points in the first set of points and the second set of points associated with a stationary component of the engine; and removing the points in the 3D point cloud of the component.

The method of any preceding clause, wherein the points associated with the stationary component of the engine are determined based on comparing images of the light projection in the plurality of frames to identify static points.

The method of any preceding clause, wherein forming the 3D point cloud of the component includes translating local coordinates of the first set of points and the second set of points to a global coordinate of the 3D point cloud based on the angular displacement.

The method of any preceding clause, wherein the light projection includes a plurality of patterns projected sequentially.

The method of any preceding clause, wherein the insertion tool includes a flexible insertion tool, a rigidizable insertion tool, a robotic arm, or a snake arm robot.

The method of any preceding clause, wherein the insertion tool includes two distal tips configured to extend apart upon insertion into the engine assembly, and the optical sensor is positioned on a first distal tip and the light source is positioned on a second distal tip.

The method of any preceding clause, wherein the light source is coupled to an insertion tool separate from the insertion tool, and wherein the insertion tool and the insertion tool are inserted through different ports of the engine assembly.

The method of any preceding clause, wherein the light source includes one or more laser light emitters.

The method of any preceding clause, wherein the light source includes a plurality of light emitters positioned around the optical sensor and coupled to the insertion tool.

The method of any preceding clause, wherein the light source includes a plurality of light emitters positioned along a length of the insertion tool.

The method of any preceding clause, wherein the light source is coupled to a first segment of the insertion tool and the optical sensor is coupled to a second segment of the insertion tool, the second segment being angled relative to the first segment during the capturing of the plurality of frames.

The method of any preceding clause, wherein the light source includes two or more of a blue light, a red light, and a green light.

The method of any preceding clause, wherein the light source includes a first light emitter outputting a first pattern of the light projection at a first wavelength and a second light emitter outputting a second pattern of the light projection at a second wavelength; and wherein the first set of points is determined based on: filtering the first frame for the first wavelength to determine a first subset of points associated with the first pattern; and filtering the first frame for the second wavelength to determine a second subset of points associated with the second pattern.

The method of any preceding clause, wherein the optical sensor includes a monochrome sensor for the first wavelength and a second monochrome sensor for the second wavelength.

The method of any preceding clause, wherein the filtering of the first frame is based on a linear filter or a Bayer filter.

The method of any preceding clause, wherein peak wavelengths of the first wavelength and the second wavelength differ by at least 50 nanometers.

The method of any preceding clause, wherein the first pattern includes a first line and the second pattern includes a second line angled relative to the first line.

The method of any preceding clause, wherein the first pattern or the second pattern includes a structured-light pattern, a grid, horizontal bars, and/or vertical bars.

The method of any preceding clause, wherein the first pattern and the second pattern at least partially overlap in the field of view of the optical sensor.

The method of any preceding clause, wherein the first pattern and the second pattern are projected concurrently.

The method of any preceding clause, wherein the first pattern and the second pattern are projected sequentially.

The method of any preceding clause, wherein the light source further includes a third light emitter that outputs a third pattern at a third wavelength, and wherein determining the first set of points further includes: determining a third subset of points based on filtering the first frame for the third wavelength.

The method of any preceding clause, wherein the component of the engine assembly includes compressor or turbine airfoils.

The method of any preceding clause, wherein the 3D point cloud is generated based on taking means between adjacent points on the first set of points and the second set of points.

The method of any preceding clause, further including: detecting anomalies on the component based on the 3D point cloud.

The method of any preceding clause, wherein the anomalies are detected based on comparing the 3D point cloud and a stored 3D model of the component of the engine assembly.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. An engine inspection system, comprising:
   an optical sensor coupled to an insertion tool configured to be inserted into an engine assembly to perform inspection;
   a light source configured to output a light projection onto a component of the engine assembly within a field of view of the optical sensor; and
   a processor configured to:
      receive data comprising a plurality of frames from the optical sensor captured while the component of the engine assembly is rotating and the light projection is projected onto the engine assembly;
      determine an angular displacement of the component between a first frame and a second frame of the plurality of frames;
      determine a first set of points based on a first image of the light projection in the first frame;
      determine a second set of points based on a second image of the light projection in the second frame; and
      form a 3D point cloud of the component based on combining the first set of points and the second set of points based on the angular displacement of the component between the first frame and the second frame.

2. The system of claim 1, wherein the light projection comprises a line pattern, a structured-light pattern, a grid, horizontal bars, or vertical bars.

3. The system of claim 1, wherein the angular displacement of the component is determined based on detecting for visual encoding on the component or a shaft of the engine assembly.

4. The system of claim 1, wherein the angular displacement of the component is determined based on illuminating the component and the light source with a broadband light source and registering a distance and/or orientation of the component relative to the optical sensor in multiple frames.

5. The system of claim 1, further comprising a component sensor spaced apart from the optical sensor, wherein the angular displacement of the component is determined based on signals from the component sensor.

6. The system of claim 1, wherein the angular displacement of the component is determined by estimating a rotation speed of the component based on the plurality of frames captured by the optical sensor.

7. The system of claim 1, wherein the light projection comprises a line projection positioned to be substantially tangential to a point on a leading edge of a compressor airfoil closest to the optical sensor or the light source when the compressor airfoil is at a rotational position closest to the optical sensor or the light source, and
wherein the processor is configured to determine the angular displacement of the component based on detecting the point on the compressor airfoil via the light projection.

8. The system of claim 1, wherein the angular displacement of the component between the first frame and the second frame is determined based on comparing the first frame and the second frame with a stored 3D model of the component.

9. The system of claim 1, wherein the first set of points comprises 3D coordinates determined based on triangulating based on a known distance between the light source and the optical sensor and displacement of a point of light in the first image of the light projection.

10. The system of claim 1, wherein the processor is further configured to determine points in the first set of points and the second set of points associated with a stationary component of the engine and remove the points from the 3D point cloud of the component.

11. The system of claim 10, wherein the points associated with the stationary component of the engine are determined based on comparing images of the light projection in the plurality of frames to identify static points.

12. The system of claim 1, wherein the insertion tool comprises two distal tips, at least one of the two distal tips configured to extend apart upon insertion into the engine assembly, and the optical sensor is positioned on a first distal tip and the light source is positioned on a second distal tip.

13. The system of claim 1, wherein the light source comprises one or more laser light emitters.

14. The system of claim 1, wherein the light source comprises a plurality of light emitters positioned around the optical sensor and coupled to the insertion tool or a plurality of light emitters positioned along a length of the insertion tool.

15. The system of claim 1, wherein the light source comprises a first light emitter outputting a first pattern of the light projection at a first wavelength and a second light emitter outputting a second pattern of the light projection at a second wavelength; and
wherein the first set of points is determined based on:
filtering the first frame for the first wavelength to determine a first subset of points associated with the first pattern; and
filtering the first frame for the second wavelength to determine a second subset of points associated with the second pattern.

16. The system of claim 15, wherein the first pattern comprises a first line and the second pattern comprises a second line angled relative to the first line.

17. The system of claim 15, wherein the light source further comprises a third light emitter that outputs a third pattern at a third wavelength, and wherein determining the first set of points further comprises:
determining a third subset of points based on filtering the first frame for the third wavelength.

18. The system of claim 1, wherein the component of the engine assembly comprises compressor or turbine airfoils.

19. The system of claim 1, wherein the processor is further configured to detect anomalies on the component based on the 3D point cloud.

20. An engine inspection method, the method comprising:
rotating a component of an engine assembly;
projecting, from a light source, a light projection onto the component of the engine assembly within a field of view of an optical sensor inserted into the engine assembly via an insertion tool;
receiving, at a processor, data comprising a plurality of frames from the optical sensor, the data being captured while the component of the engine assembly is rotating and the light projection is projected onto the component;
determining, with the processor, an angular displacement of the component between a first frame and a second frame of the plurality of frames;
determining, with the processor, a first set of points based on a first image of the light projection in the first frame;
determining, with the processor, a second set of points based on a second image of the light projection in the second frame; and
forming, with the processor, a 3D point cloud of the component based on combining the first set of points and the second set of points based on the angular displacement of the component between the first frame and the second frame.

* * * * *